(12) United States Patent
Maw et al.

(10) Patent No.: US 10,896,435 B2
(45) Date of Patent: Jan. 19, 2021

(54) MERCHANT VOUCHER OFFER PROCESSING METHOD AND APPARATUS

(71) Applicant: MASTERCARD INTERNATIONAL INCORPORATED, Purchase, NY (US)

(72) Inventors: Brian Maw, Norwalk, CT (US); Jennifer Dogin, Mamaroneck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 580 days.

(21) Appl. No.: 13/895,123

(22) Filed: May 15, 2013

(65) Prior Publication Data
US 2014/0304047 A1    Oct. 9, 2014

Related U.S. Application Data

(63) Continuation-in-part of application No. 13/858,616, filed on Apr. 8, 2013.

(51) Int. Cl.
| | | |
|---|---|---|
| *G06Q 30/00* | (2012.01) | |
| *G06Q 30/02* | (2012.01) | |
| *G06Q 30/06* | (2012.01) | |
| *G05B 19/418* | (2006.01) | |

(52) U.S. Cl.
CPC ..... *G06Q 30/0241* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 7,848,940 | B1* | 12/2010 | Harniman | G06Q 10/02 705/1.1 |
| 2004/0220854 | A1* | 11/2004 | Postrel | G06Q 30/02 705/14.35 |
| 2005/0021400 | A1* | 1/2005 | Postrel | 705/14 |
| 2009/0204500 | A1* | 8/2009 | Shpun | G06Q 30/00 705/14.25 |
| 2010/0250385 | A1* | 9/2010 | Lempel | G06Q 30/0601 705/26.1 |
| 2011/0153403 | A1* | 6/2011 | Postrel | G06Q 30/02 705/14.29 |
| 2012/0084132 | A1* | 4/2012 | Khan | G06Q 30/0225 705/14.26 |

OTHER PUBLICATIONS

U.S. Appl. No. 13/858,616 (US-2014-0304049-A1), filed Apr. 8, 2013 (Oct. 9, 2014), Brian Maw (MasterCard Int'l, Inc.).
U.S. Appl. No. 13/895,091, filed May 15, 2013, Brian Maw (MasterCard Int'l, Inc.).
U.S. Appl. No. 13/895,112 (US-2014-0304091-A1), filed May 15, 2013, Brian Maw (MasterCard Int'l, Inc.).
Non-Final Office Action issued by the U.S. Patent & Trademark Office dated Apr. 3, 2015 for U.S. Appl. No. 13/858,616, filed Apr. 8, 2013 and published as US-2014-0304049-A1 (Inventor—Maw, et al // Applicant—MasterCard International Incorporated) (11 pages).

* cited by examiner

*Primary Examiner* — Maria V Vanderhorst
(74) *Attorney, Agent, or Firm* — Ballard Spahr LLP

(57) ABSTRACT

A system, method, and computer-readable storage medium configured to link electronic voucher offers with complementary voucher offers and consolidate redemption of electronic vouchers with electronic payments into a single transaction.

14 Claims, 11 Drawing Sheets imagetitle: MERCHANT VOUCHER OFFER PROCESSING METHOD AND APPARATUS

MERCHANT VOUCHER OFFER PROCESSING METHOD AND APPARATUS

RELATED APPLICATION

This application is a continuation-in-part of U.S. patent application Ser. No. 13/858,616, entitled "Top Up Process Flow Method and Apparatus," filed on Apr. 8, 2013, from which priority is claimed and incorporated herein by reference in its entirety.

BACKGROUND

Field of the Invention

Aspects of the disclosure relate in general to financial services. Aspects include an apparatus, system, method and computer-readable storage medium to enable the linkage of electronic offer vouchers. Other aspects include presenting and using the linked electronic offer vouchers in payment transactions.

Description of the Related Art

A voucher is a certificate which is worth a certain monetary value and which may be spent only for specific reasons or on specific goods. Examples include merchant, travel, and food vouchers.

Merchants sometimes offer or sell vouchers to promote business.

Increasingly, third party vendors, such as Groupon or Living Social, act as merchant relationship managers and sell vouchers on a merchant's behalf. Such merchant relationship managers sell the voucher to the customer, allowing the customer to print the voucher at home, pocketing part of the sale, and forwarding the rest of the sale to the merchant.

Often when a voucher is redeemed at a merchant, the amount of goods or services purchased usually exceeds that of the voucher. Customers must then make another financial transaction to pay for the difference, which is an inconvenience.

Another problem with vouchers is that if the voucher is misplaced or lost, often the monetary value associated with the voucher cannot be redeemed.

SUMMARY

Embodiments include a system, device, method and computer-readable medium configured to facilitate customer input on linked electronic voucher offers with complementary voucher offers. A user interface is configured to receive a user proposed electronic voucher offer, the user proposed electronic voucher offer having offer terms including a first merchant. A network interface is configured to upload the user proposed electronic voucher to a merchant relationship manager.

DETAILED DESCRIPTION

Figure 1:
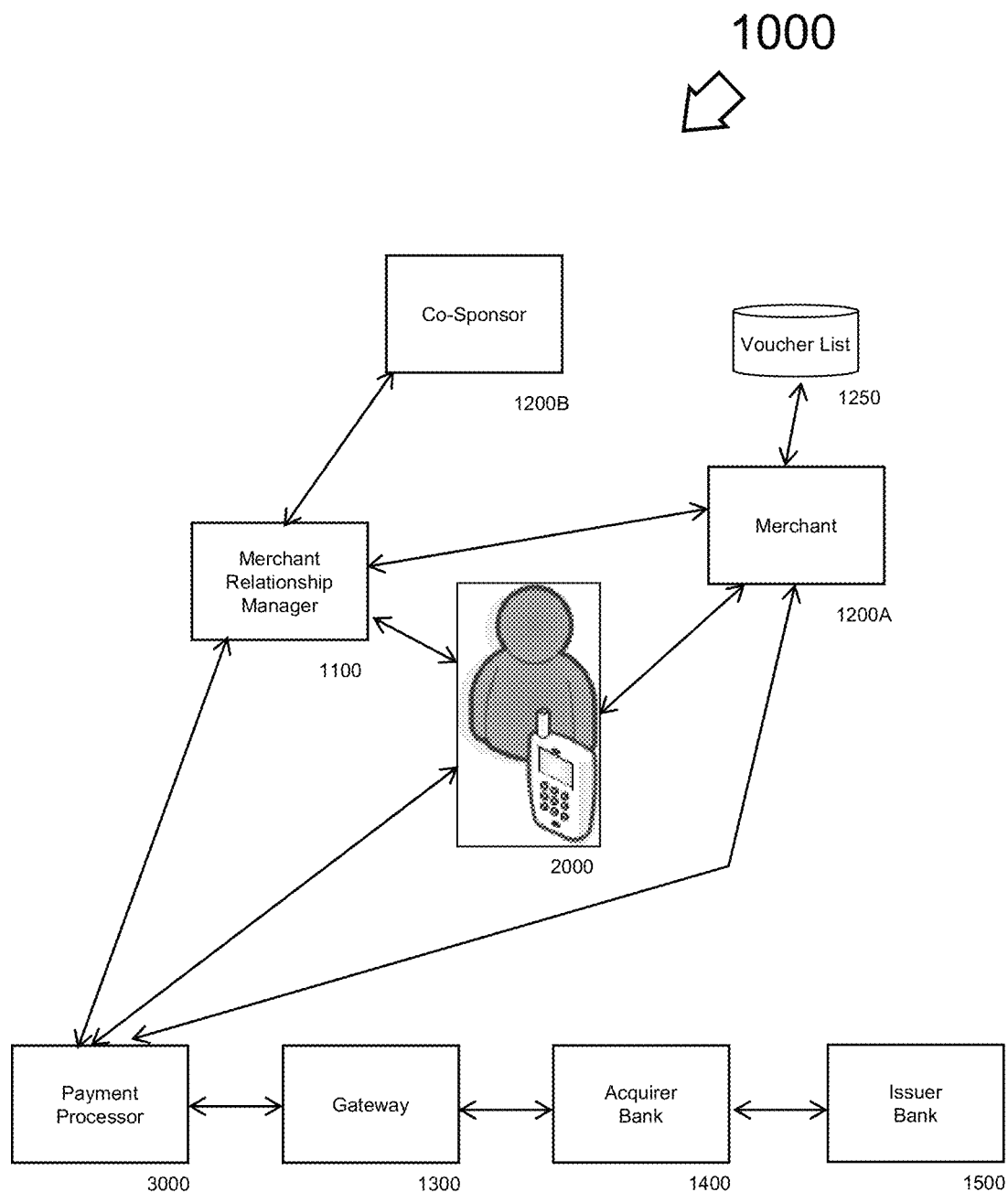
FIG. 1 illustrates an embodiment of a system configured to link and redeem electronic vouchers.

One aspect of the disclosure includes the realization that the use of electronic vouchers associated to a customer's mobile device prevents loss of a voucher, and can simplify the consolidation of voucher redemptions with a payment transaction for uncovered amounts ("top-up").

Another aspect of the disclosure includes the understanding that electronic vouchers represent offers from vendors, and that offers from vendors may be complimentary with offers from other vendors or sponsors. Through linking complementary offers, and presenting the complementary offers to consumers, embodiments give consumers the opportunity to save money on additional products and services, and provide merchants an additional opportunity to sell other goods and services ("up-sell") to customers.

A further aspect of the disclosure includes obtaining feedback from customers regarding purchase/redemption of the electronic voucher, and merchants receiving customer proposed electronic vouchers.

Additionally, when redemption of vouchers and payments is consolidated, merchants can more easily mine the data to learn more about their customer base. For example, it may be useful for a spa (merchant) to realize that 80% of their massage customers also purchase manicures at the same time, or that pedicure customers rarely try a massage therapy except when massage services are on sale.

Analyzing customer purchase data may offer merchants the opportunity to intelligently up-sell or cross-sell additional services or products to customers. Again using the spa example, when a voucher is being redeemed at the spa, the spa may offer pedicure customers an additional voucher for discounted massage services to earn additional revenue during the point-of-sales transaction.

Embodiments enable users to dynamically consolidate voucher redemptions with electronic "top-up" payments, eliminating a separate payment process as the electronic payment is bound to the voucher transaction as a single transaction. In some embodiments, customers may bind any form of electronic payment, such as credit cards, debit cards, prepaid cards, electronic checking, or electronic wallet payments. In some embodiments, customers can automatically pay for amounts with the same form of payment used to purchase the voucher. In other embodiments, the merchant relationship manager or payment processor may enforce the use of a specific type of payment with the top-up process. For example, the voucher may be offered as a promotion to a specific issuer banking institution, or as a promotion for a payment processor such as MasterCard™, a trademark of MasterCard International Incorporated. In such cases, the voucher deal parameters may require payment using a MasterCard credit card, as an example.

As a result of the consolidation of voucher redemption with electronic "top-up" payments, customers can pay for tips, products and/or services with an appropriate voucher via a mobile device without having to reach into their pocket for cash, payment cards, or check books.

In another aspect of the disclosure, embodiments notify merchants and/or customers of their voucher redemption.

These and other aspects may be apparent in hindsight to one of ordinary skill in the art.

Embodiments of the present disclosure include a system, method, and computer-readable storage medium configured to consolidate and redeem electronic vouchers.

FIG. 1 illustrates an embodiment of a system 1000 configured to purchase, and to consolidate redemption of electronic vouchers with electronic payments, constructed and operative in accordance with an embodiment of the present disclosure.

System 1000 includes consumers using mobile computing devices 2000 to connect to a relationship manager 1100, merchant 1200A, or payment processor 3000 via a data network, such as a mobile telephone or data network, the Internet, and the like. A co-sponsor 1200B may also be connected to merchant relationship manager 1100 via the data network. Merchant 1200 may have a voucher list 1250 storing electronic vouchers. Additionally, payment processor 3000 may connect in turn to gateway 1300, acquirer bank 1400, or issuer bank 1500. Details and example methods of mobile device 2000 and payment processor 3000 are discussed below.

Mobile device 2000 enables customers to purchase, redeem and consolidate vouchers through electronic communications with merchant relationship manager 1100, merchant 1200, and payment processor 3000.

Merchant relationship manager 1100 may offer for sale (or for free) electronic vouchers to be used for goods or services at merchant 1200A and/or linked electronic vouchers for goods or services at co-sponsor 1200B. A co-sponsor is an entity that offers a linked voucher that is linked to the electronic voucher offered for merchant 1200A. For example, suppose merchant 1200A is a cafe with an electronic voucher for discounted coffee. As coffee-and-donuts are a popular combination, co-sponsor 1200B may be a geographically close donut shop that has an electronic voucher for discounted donuts when a coffee is purchased from merchant 1200A. In some embodiments, the electronic voucher for donuts (from the co-sponsor 1200B) is electronically linked that is linked to the electronic coffee voucher (from the merchant 1200A).

Merchant relationship manager 1100 processes merchant voucher information provided by the merchant 1200 (or other vendor) that may be included in a mobile app executed on mobile device 2000. Additionally merchant relationship manager 1100 may store data that contains the vouchers themselves, and the list of merchants 1200 that sell vouchers, and the financial information (such as an acquirer bank 1400 or issuer bank 1500) required to send a payment.

Payment processor 3000 includes the set of API functions, processes, and data that allow the merchant relationship manager 1100 to connect a merchant 1200 to a payment and provide a relationship matching to ensure the proper payment format is produced and the payment is sent to the correct financial entity. Payment processor 3000 produces acquirer bank 1400 format to ensure payment information is processed according to the Payment Card Industry Data Security Standard (PCI DSS) and financial industry standards. The Payment Card Industry Data Security Standard (PCI DSS) is a set of requirements designed to ensure that companies that process, store or transmit credit card information maintain a secure environment.

The merchant 1200A may be a brick and mortar location, an optimized mobile World-Wide-Web (WWW or "web") site, an electronic commerce site, or any combination thereof. In various embodiments, merchant 1200A offers products or services that are associated with electronic vouchers.

Similarly, co-sponsor 1200B may be another merchant, service, charity, or other entity that offers an electronic voucher that is linked to the voucher of another entity (such as merchant 1200A).

Gateway 1300 is a standard component that connects the merchant systems 1200 to a payment network, and processes data that is sent to an acquirer 1400.

An acquirer bank 1400 is configured to process data from the gateway 1300 and prepares the authorization formatted data for the payment network, usually sent directly to the issuer.

An issuer bank 1500 is the institution that provides the credit for the financial payment transaction. Issuer bank 1500 processes data (authorization requests) from the acquirer 1400 and prepares the authorization formatted response (approvals/declines).

In some embodiments, consumers may use a mobile device 2000, such as a mobile phone, tablet computer, personal digital assistant (PDA) to buy a voucher (associated with a merchant 1200) from relationship manager 1100 via a wireless data network capable of connecting to the Internet. It is understood that wireless data network may be a wireless data provider such as a cellular telephone network, wireless local area network (WLAN or "WiFi networks"), satellite data networks, and the like. Mobile devices 2000 include computing devices such as mobile telephones, tablet computers, laptop computers, "ultra books" or other portable computing device known in the art capable of communicating to merchant relationship manager 1100.

In some embodiments, merchant relationship manager 1100 and payment processor 3000 may be the same entity, or different entities.

Additionally, as shown in FIG. 1, consumers may use mobile device 2000 to redeem vouchers at merchants 1200 with assistance from payment processor 3000.

Payment processor 3000 is a payment network capable of processing payments electronically. An example payment processor 3000 includes MasterCard International Incorporated.

Embodiments will now be described wherein a payment processor 3000 also acts a merchant relationship manager 1100. It is understood by those familiar with the art that, payment processor 3000 embodiments may also interface with other (separate) merchant relationship managers 1100.

Figure 2:
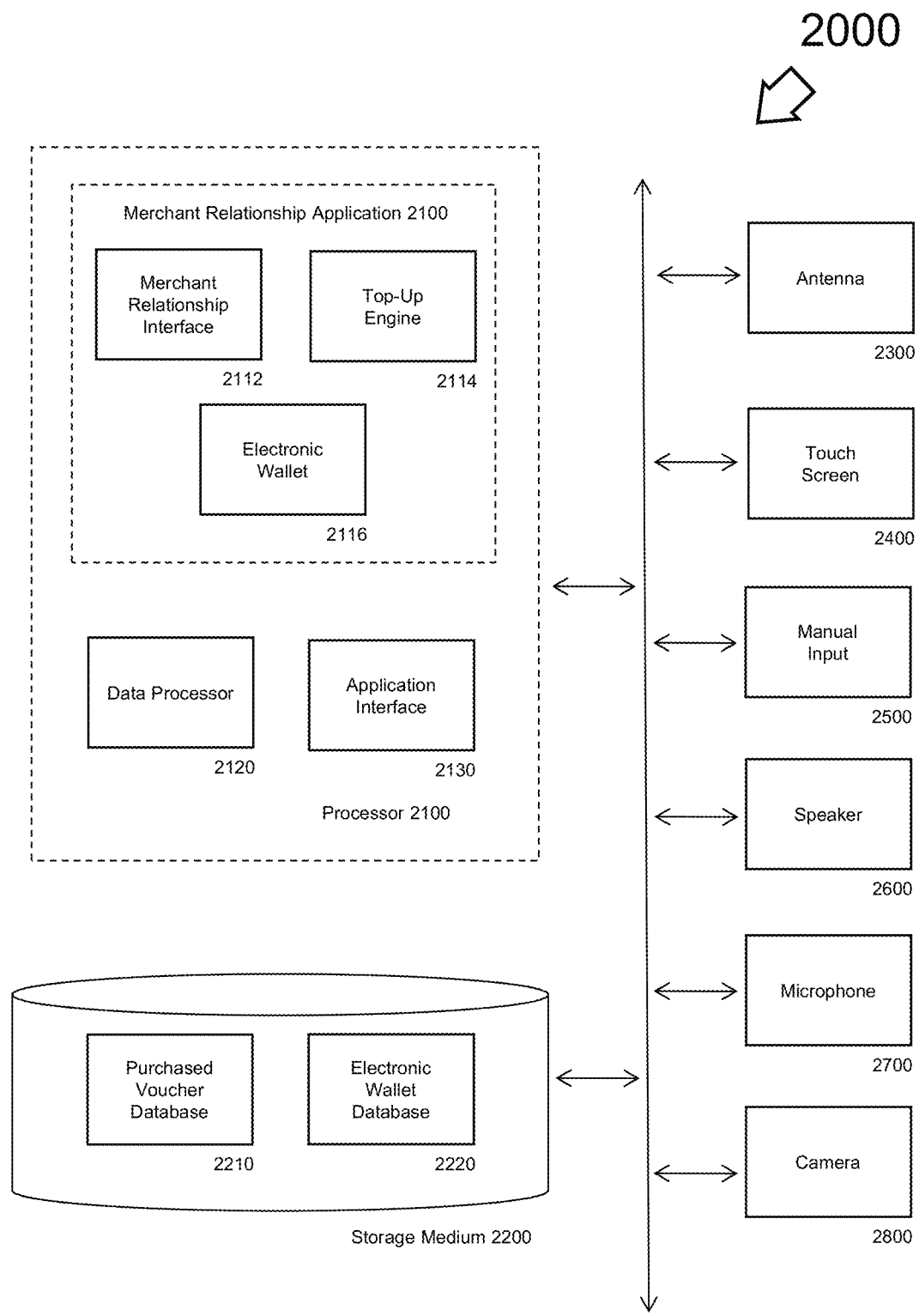
FIG. 2 depicts a mobile device embodiment configured to consolidate the redemption of electronic vouchers.

Embodiments will now be disclosed with reference to a block diagram of a mobile device 2000 of FIG. 2, constructed and operative in accordance with an embodiment of the present disclosure. Mobile device 2000 is configured to enable the purchase of electronic vouchers, and to consolidate and redeem the electronic vouchers.

Mobile device 2000 may run a real-time multi-tasking operating system (OS) and include at least one processor or central processing unit (CPU) 2100, a non-transitory computer-readable storage medium 2200, and a network interface 2300. An example operating system may include the Apple iOS, Google Android Operating System, Blackberry OS, FireFox mobile operating system, Microsoft Windows 8, and the like. Mobile device 2000 may further include a screen or display device 2400, manual input 2500, speaker 2600, microphone 2700, and/or camera 2800.

Processor 2100 may be any central processing unit, microprocessor, micro-controller, computational device or circuit known in the art.

As shown in FIG. 2, processor 2100 is functionally comprised of a merchant relationship application 2100, a data processor 2120, and application interface 2130.

Merchant relationship application 2100 enables the functionality for the consumer to interact with the deal provider (merchant relationship manager 1100) to buy a voucher, find a location to redeem the purchased voucher, interact with the merchant 1200 to redeem the voucher, provide the ability to add a top-up value to the purchase, and for the customer to validate that their payment was processed successfully. A top up value could be for additional services, a tip, service charge, and the like. Merchant relationship application 2100 may further comprise: merchant relationship interface 2112, top-up engine 2114, and electronic wallet 2116.

Merchant relationship interface 2112 enables merchant relationship application 2100 to communicate with merchant relationship manager 1100 and/or payment processor 3000 to accomplish any and all of these tasks. To do this, Merchant relationship interface 2112 communicates with merchant relationship manager 1100 to determine the vouchers available to the customer. In Global Position System (GPS) enabled mobile device 2000 embodiments, merchant relationship interface 2112 may communicate GPS coordinates with the merchant relationship manager 1100 to help determine the proximate merchants 1200 with available vouchers. Additionally merchant relationship interface 2112 may contain a merchant validation and look-up feature, and may be connected to a merchant services interface at a payment processor 3000.

Top-up engine 2114 enables voucher redemption and consolidates the "top-up" purchase process with the voucher redemption. Further details and uses of top-up engine 2114 are described further herein.

An electronic wallet 2116 is a program or service where users can store and control their electronic shopping information, like logins, passwords, billing address, shipping address, payment card details, contactless payment information, Primary Account Numbers, in one central place. An electronic wallet 2116 is a structure that enables electronic forms of payment, such as a contactless or near-field communication (NFC) payment, and may be associated with any electronic form of payment known in the art, such as credit cards, debit cards, pre-paid cards, charge cards, electronic checks, electronic funds transfers, or any other form of electronic payment known in the art.

Data processor 2120 enables processor 2100 to interface with storage media 2200, antenna 2300, touch screen 2400, manual input 2500, speaker 2600, microphone 2700, camera 2800, computer memory or any other component not on the processor 2100. The data processor 2120 enables processor 2100 to locate data on, read data from, and write data to these components.

Application interface 2130 may be any graphical user interface known in the art to facilitate communication with the user of the mobile device 2000; as such, application interface 2130 may communicate with the user via touch screen 2400, manual input 2500, speaker 2600, microphone 2700, or camera 2800.

These structures may be implemented as hardware, firmware, or software encoded on a computer readable medium, such as storage media 2200. Further details of these components are described with their relation to method embodiments below.

Network interface 2300 may be any data port as is known in the art for interfacing, communicating or transferring data across a telecommunications network, computer network, near-field communications, contactless point-of-sale network, and the like. For mobile device 2000, an example of a network interface is an antenna 2300. An example of such a network includes a digital cellular telephony network. Antenna 2300 allows mobile device 2000 to communicate with merchant relationship manager 1100, merchant 1200, payment processor 3000, or other entities. Near field communication is a set of standards for smartphones and similar devices to establish radio communication with each other by touching them together or bringing them into close proximity.

Screen 2400 may be any a liquid crystal display (LCD) display, light emitting diode (LED) screen, touch-sensitive screen, or other monitor known in the art for visually displaying images and text to a user.

Manual input 2500 may be buttons, a conventional keyboard, keypad, track pad, trackball, or other input device as is known in the art for the manual input of data. In some embodiments, manual input 2500 may be integrated into a touch-sensitive screen 2400. In other embodiments, manual input 2500 may be a virtual keyboard.

In addition, a speaker 2600 may be attached for reproducing audio signals from processor 2100. Microphone 2700 may be any suitable microphone as is known in the art for providing audio signals to processor 102. Camera 2800 may be a digital or analog video camera device to record still or moving images. It is understood that microphone 2700, speaker 2600, and camera 2800 may include appropriate digital-to-analog and analog-to-digital conversion circuitry as appropriate Storage medium 2200 may be a conventional read/write memory such as a flash memory, memory stick, transistor-based memory, or other computer-readable memory device as is known in the art for storing and retrieving data.

In addition, as shown in FIG. 2, storage medium 2200 may also contain a purchased voucher database 2210, and an electronic wallet database 2220. Purchased voucher database 2210 is configured to store information associating users with purchased vouchers. Purchased vouchers have data associated with them, including the merchant 1200 offering the detail, amount of the voucher, and deal parameters. Deal parameters may include purchase requirements, deal (participating) locations, date of expiration, and top-up payment details. For example, a voucher offered as a Priceless™ promotion by MasterCard International Incorporated may require payment via a MasterPass™ electronic wallet payment associated with the mobile device 2000. Similarly, deals may require payment by electronic payment cards issued by specific issuer banks 1500.

It is understood by those familiar with the art that one or more of these databases 2210-2220 may be combined in a myriad of combinations.

Embodiments will now be disclosed with reference to a block diagram of an exemplary payment processor server 3000 of FIG. 2, constructed and operative in accordance with an embodiment of the present disclosure. In this embodiment, payment processor server 3000 acts as a merchant relationship manager 1100. It is understood, by those familiar with the art, that stand-alone embodiments of merchant relationship manager 1100 may be similar, the same, or different from a payment processor server 3000 disclosed herein.

Payment processor server 3000 may run a multi-tasking operating system (OS) and include at least one processor or central processing unit (CPU) 3100, a non-transitory computer-readable storage medium 3200, and a network interface 3300.

Processor 3100 may be any central processing unit, microprocessor, micro-controller, computational device or circuit known in the art.

Figure 3:
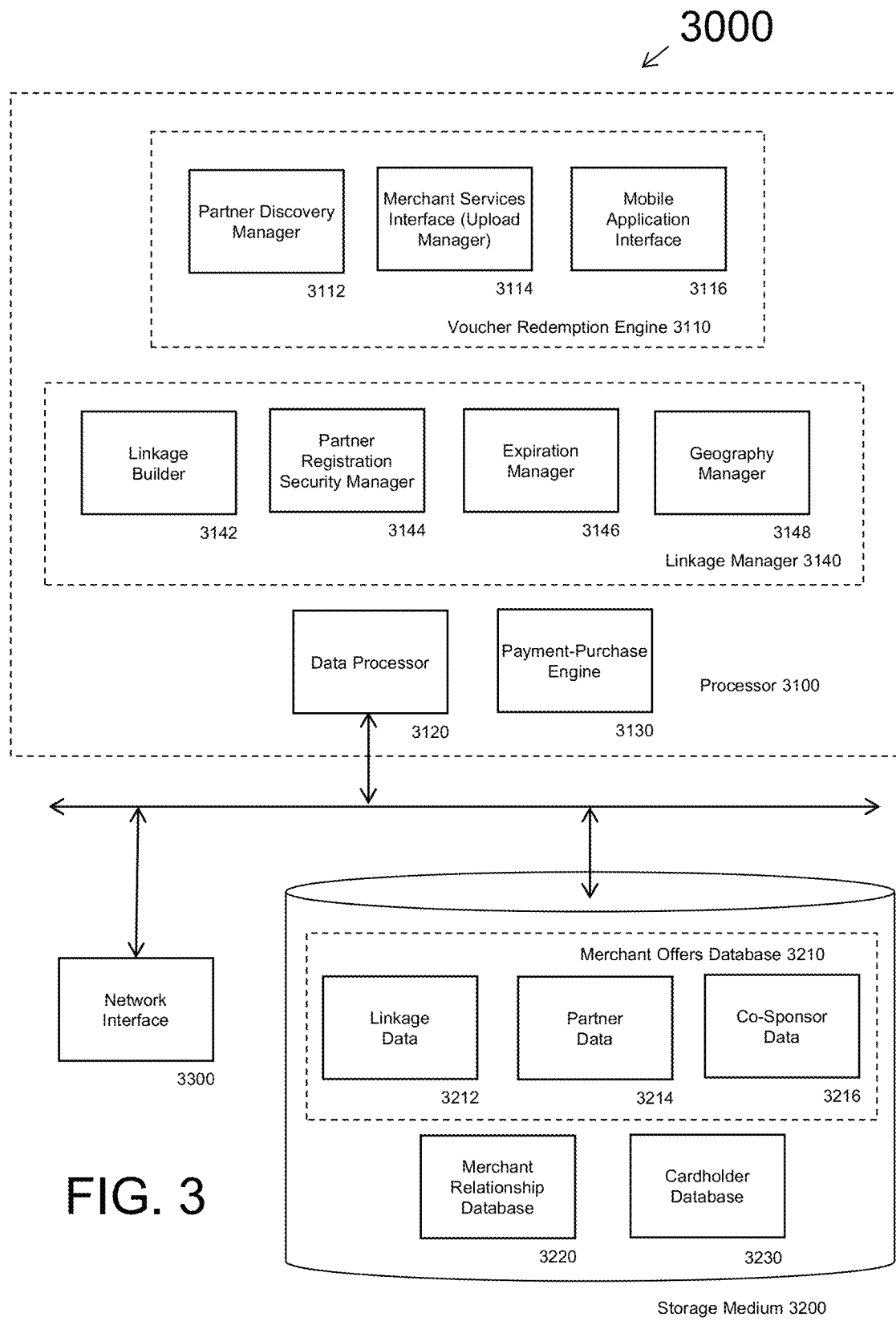
FIG. 3 is a block diagram of a payment processor embodiment configured to link and redeem electronic vouchers.

As shown in FIG. 3, processor 3100 is functionally comprised of a voucher redemption engine 3110, a linkage manager 3140, a payment-purchase engine 3130, and a data processor 3120. Voucher redemption engine 3110 and linkage manager 3140 are used in embodiments where payment processor 3000 also functions as a merchant relationship manager 1100. It is understood by those familiar with the art that stand-alone merchant relationship manager 1100 may have similar elements.

Voucher redemption engine 3110 may further comprise: partner discovery manager 3112 (sometimes also referred to as a "merchant relationship engine"), merchant services interface 3114 (sometimes also referred to as an "upload manager"), and mobile application interface 3116. In such embodiments, partner discovery manager 3112 acts as an interface between merchant 1200, and customer mobile device 2000, providing and listing available vouchers.

In some embodiments, voucher redemption engine 3110 may provide custom-tailored offers for particular customers based on, for example, geographic location, economic demographics, purchase history a likelihood of repeat business for a merchant 1200 or other relevant factors. Certain techniques for identifying particular groups of people using such data are described for example, in U.S. patent application Ser. No. 13/437,987. In other embodiments, voucher redemption engine 3110 may provide customers vouchers that are linked to other vouchers by linkage manager 3140. Partner discovery manager 3112 may store available merchant vouchers and the linked voucher details in a merchant offers database 3210.

Merchant services interface 3114 is the portion of the voucher redemption engine 3110 that communicates and facilitates the voucher redemption with the merchant 1200. Merchant services interface 3114 enables merchants 1200A and co-sponsors 1200B to upload specific terms and conditions for various voucher offers. Embodiments enable the functionality for the consumer to interact with (merchant relationship manager 1100 (or partner discovery manager 3112) to buy a voucher, find a location to redeem the purchased voucher, interact with the merchant 1200 to redeem the voucher. Merchant services interface 3114 may store data related to purchased merchant vouchers and the linked voucher details in a merchant relationship database 3220.

Linkage manager 3140 is configured to provide the intelligence to link complementary offers from merchants 1200A and co-sponsors 1200B. Linkage manager may further comprise a linkage builder 3140, a partner registration security manager 3144, expiration manager 3146, and geography manager 3148.

Linkage builder 3142 is configured to link complementary offers from merchants 1200A and co-sponsors 1200B that are stored in a merchant offers database 3210.

Partner registration security manager 3144 is enabled to provide verification and secure communication with merchants 1200A and co-sponsors 1200B.

Expiration manager 3146 is configured to remove expired offers from a merchant offers database 3210.

Geography manager 3148 is configured to sort and determine relevant offers stored in a merchant offers database 3210 based on the global positioning system (GPS) or other location-based information sent by mobile device 2000.

Payment-purchase engine 3130 performs payment and purchase transactions, and may do so in conjunction with redeeming vouchers. Furthermore, payment-purchase engine 3130 provides the ability to add a top-up value to the purchase, and to validate that the payment is processed successfully. Merchant services interface 3114 may store data related to cardholder payment credit, debit, or charge information in a cardholder database 3230.

Data processor 3120 enables processor 3100 to interface with storage media 3200, network interface 3300 or any other component not on the processor 2100. The data processor 3120 enables processor 3100 to locate data on, read data from, and write data to these components.

These structures may be implemented as hardware, firmware, or software encoded on a computer readable medium, such as storage media 3200. Further details of these components are described with their relation to method embodiments below.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 3300 allows payment processor server 3000 to communicate with merchants 1200A, co-sponsor 1200B, consumer 2000, merchant relationship managers 1100, gateways 1300, acquirer bank 1400, and/or issuer bank 1500.

Computer-readable storage media 3200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage media 3200 may be remotely located from processor 3100, and be connected to processor 3100 via a network such as a local area network (LAN), a wide area network (WAN), or the Internet.

In addition, as shown in FIG. 3, storage media 3200 may also contain a merchant offers database 3210, a merchant relationship database 3220, and a cardholder database 3230. Merchant offers database 3210 is configured to store available merchant vouchers as partner data 3214 or co-sponsor data 3216, and the voucher linkage data 3212. Merchant relationship database 3220 is configured to store data related to purchased merchant vouchers and the linked voucher details 3212. Cardholder database 3230 facilitates the look-up of issuers 1500 and cardholder information.

It is understood by those familiar with the art that one or more of these databases 3210-3230 may be combined in a myriad of combinations. The function of these structures may best be understood with respect to the flowcharts of FIGS. 4-8, as described below.

We now turn our attention to method or process embodiments of the present disclosure, FIGS. 4-11. It is understood by those known in the art that instructions for such method embodiments may be stored on their respective computer-readable memory and executed by their respective processors. It is understood by those skilled in the art that other equivalent implementations can exist without departing from the spirit or claims of the invention.

Figure 8:
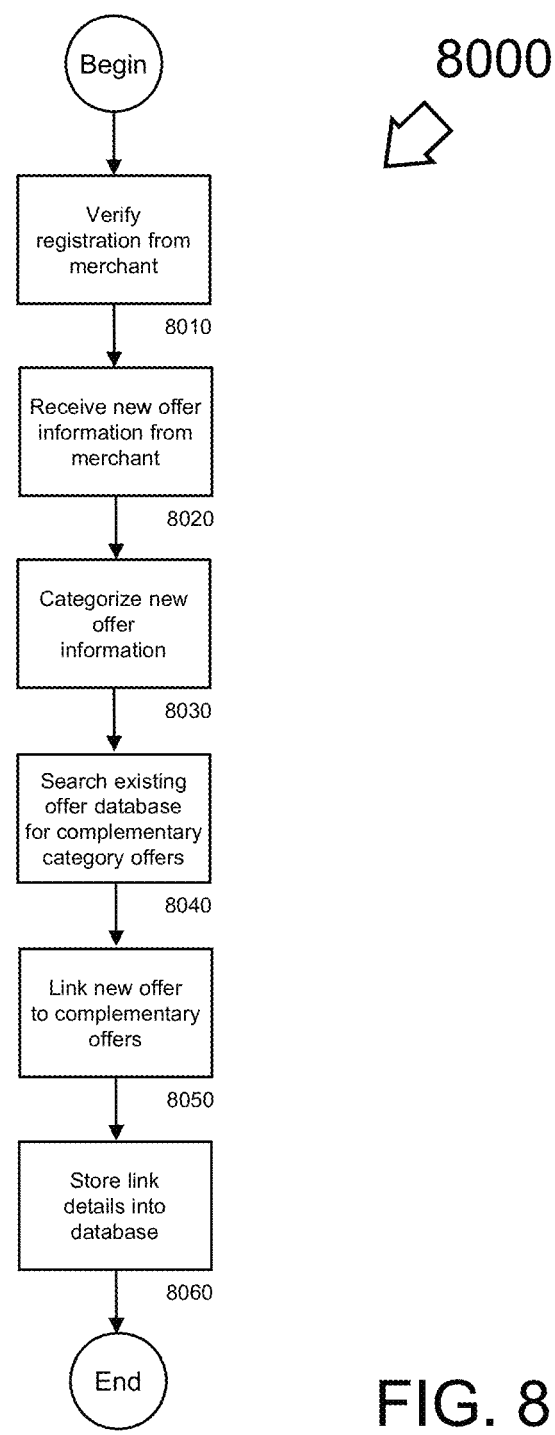
FIG. 8 flowcharts a payment processor method embodiment to link electronic vouchers.

In some embodiments, a merchant relationship manager 1100 or a payment processor 3000 acting as a merchant relationship manager 1100 may link offer vouchers that are complementary to each other. For example, a voucher for a discounted coffee offer may be linked to a different voucher offer for donuts. Linking complementary offers enables embodiments to search and present offers that are potentially useful to consumers quickly. FIG. 8 flowcharts a payment processor method 8000 embodiment to receive and link electronic voucher offers, constructed and operative in accordance with an embodiment of the present disclosure. As described above, in this embodiment payment processor 3000 acts as a merchant relationship manager 1100. As described in the embodiment below, this linkage may occur at the time when the offer is being uploaded into the system; it is understood by those familiar with the art that the method described below is for illustrative purposes only, and that the linkage may occur at any time convenient for the payment processor server 3000.

In some embodiments, method 8000 may be a batch method that allows merchants or co-sponsors 1200 to upload offers to a payment processor 3000.

Initially at block 8010, partner registration security manager 3144 verifies registration by a merchant 1200. In some embodiments, the verification may be a password or passkey, and communication between the merchant 1200 and the payment processor may occur via a secure socket layer (SSL), virtual private network (VPN) or any other secure communication method known in the art. Verifying registration helps prevent fraudulent voucher offers from being upload on to the payment processor server 3000.

At block 8020, merchant services interface 3114 acquires the details of the voucher offer from merchant 1200 via the network interface 3300. The voucher offer details may be communicated to payment processor server 3000 in a myriad of different formats. Such voucher offer details may include an image and/or description of the goods or services being offered, a price or discount, a timeframe for the offer, and/or specific terms and conditions for the offer.

Expiration manager 3146 may automatically police and delete voucher offers that have expired.

In some instances, the voucher offer details may also include geographical information in the terms and conditions. For example, a coffee café merchant may limit a discount offer to specific stores or geographical region. Geography manager 3148 enables this functionality.

Once the voucher offer details are captured, the voucher offer is categorized into predetermined categories by payment processor 3000, block 8030. Voucher offer details may have more than one category. Categories may be based on the types of good or services sold, may have a geographic component, or be based on the type of merchant. For example, a voucher offer for discounted coffee may be categorized under a "food and restaurants" category, while a resort voucher may be categorized under a "hotels and lodging" category. Offers may be categorized based on geography, such as "New York City." Still other offers may be based on the type of co-sponsor, such as "NFL Football" or "charity." Categories may have subcategories; for example, the "food and restaurant" category may also have a coffee shop, cuisine-type or fast-food subcategories.

At decision block 8040, linkage builder 3142 searches the merchant offers database 3210 for partner data 3214 or co-sponsor data 3216 that is a complementary category with the voucher offer. In some embodiments, merchant 1200 may have specified rules that match offers from complementary categories based on dynamic or predetermined criteria. The criteria may include geography of the other merchant, offer terms, offer merchandise, length of time of the offer.

At block 8050, linkage builder 3142 links the voucher offer with complementary voucher offers. Vouchers may be complementary depending upon the category and geography of the voucher offer.

The linkage data 3212 is saved at the merchant offers database 3210, block 8060.

Figure 4:
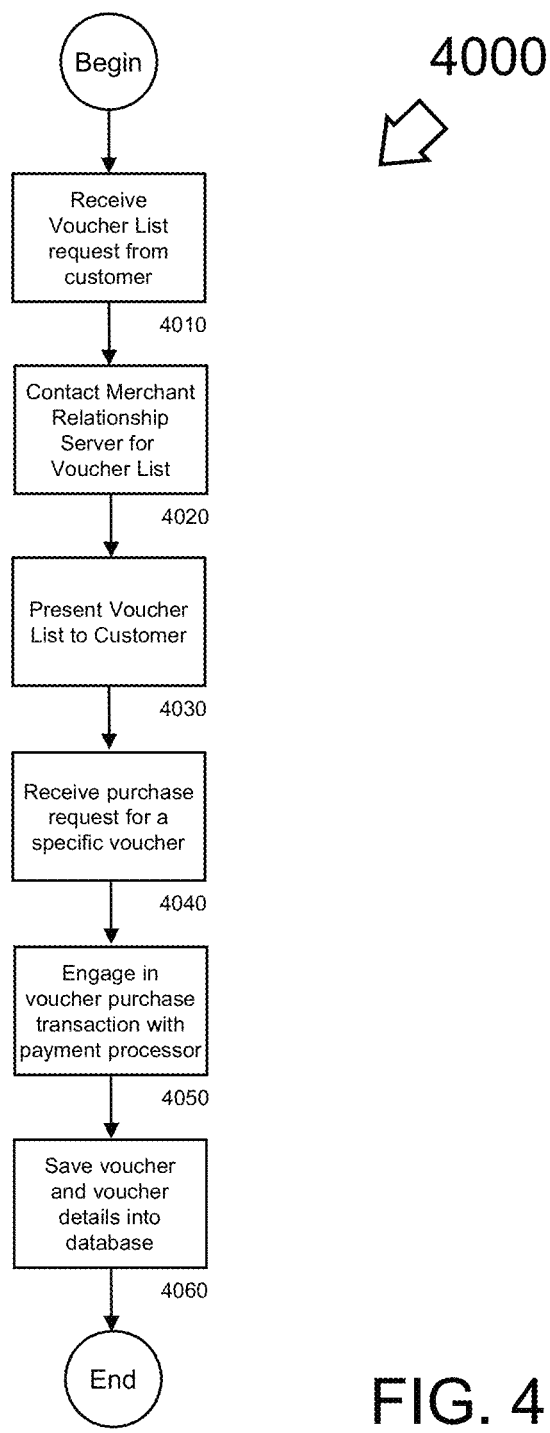
FIG. 4 is a flowchart of an embodiment to enable the purchase of an electronic voucher from a mobile device.
Figure 5:
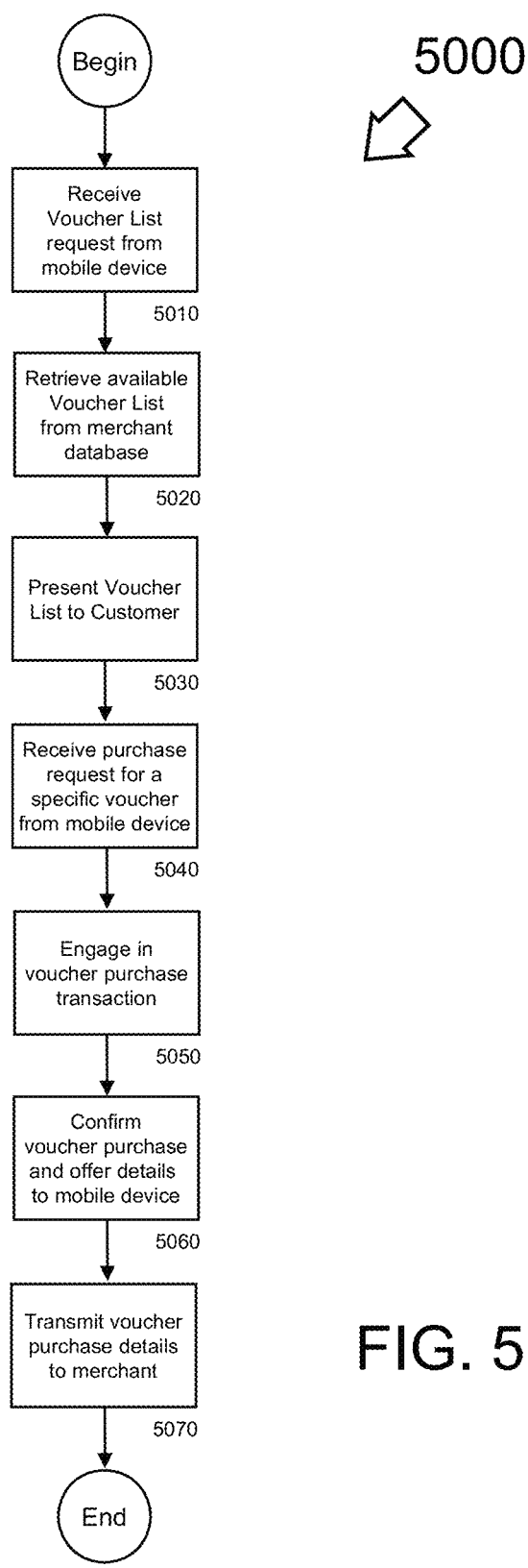
FIG. 5 illustrates a flowchart of a payment processor method embodiment to support the purchase of an electronic voucher from a mobile device.

FIGS. 4 and 5 flowchart method embodiments enable the purchase of an electronic voucher through mobile device 2000, constructed and operative in accordance with an embodiment of the present disclosure. FIG. 4 illustrates a mobile device purchase method 4000, while FIG. 5 illustrates a corresponding payment processor method 5000.

FIG. 4 illustrates process 4000 executed by mobile device 2000, constructed and operative in accordance with an embodiment of the present disclosure. Initially at block 4010, application interface 2130 receives user input from either touch screen 2400 and/or manual input 2500, requesting a list of available vouchers.

Using antenna 2300, merchant relationship interface 2112 contacts merchant relationship manager 1100 for the list of available vouchers, block 4020. In some embodiments, merchant relationship interface 2112 may have downloaded the available list prior to the user request, or may have the available voucher list cached. The available voucher list is presented to customer via display 2400, block 4030.

In some embodiments, for this purpose, payment processors 3000 with a partner discovery manager 3112 may also act as merchant relationship managers 1100.

When user selects a specific voucher or vouchers for purchase, application interface 2130 receives user input from either touch screen 2400 and/or manual input 2500, block 4040.

At block 4050, electronic wallet 2116 is engaged to perform the voucher purchase. In doing so, electronic wallet 2116 may use any electronic payment information stored within electronic wallet database, including, but not limited to: logins, passwords, electronic checking account numbers, and/or payment card details.

Once payment is made for the electronic voucher, merchant relationship interface 2112 receives confirmation of the voucher purchase details from merchant relationship manager 1100, and stores the electronic voucher into purchased voucher database 2110, at block 4060. As mentioned above, purchased vouchers have data associated with them, including the merchant 1200 associated with the voucher, amount of the voucher, and deal parameters. Deal parameters may include purchase requirements, deal (participating) locations, date of expiration, and top-up payment details. In some embodiments, the purchased voucher data may include an identifier identifying the customer that purchased the electronic voucher and/or the type of payment used to make the purchase. Additionally, in some embodiments electronic vouchers have an associated unique identifier; in such embodiments, the unique identifier may be used to verify the validity of the electronic voucher, and track the purchase and redemption of the electronic voucher. Any or all of the above-described information may be stored into the purchased voucher database 2110.

Moving to FIG. 5, process 5000 is a payment processor purchase process to support process 4000 executed by mobile device 2000, constructed and operative in accordance with an embodiment of the present disclosure. Initially at block 5010, mobile application interface 3116 receives a request for a list of available vouchers from mobile device 2000 via network interface 3300. As described below, payment processor 3000 has a relationship engine 3112, allowing the payment processor 3000 to act as a merchant relationship manager 1100

Merchant services interface 3114 contacts merchant database for the list of available vouchers, block 5020. Merchant offers database 3210 stores the details of vouchers available to customers. In some embodiments, merchant services interface 3114 may appropriately filter the voucher offers. Filtering may occur based on geography, date of desired activity, or based on customer demographics or spending pattern. In some embodiments, merchant services interface 3114 may contact partner discovery manager 3112 or a separate merchant relationship manager 1100 for the available voucher list.

The mobile application interface 3116 presents the available voucher list to mobile device 2000 via network interface 3300, block 5030.

When user selects a specific voucher or vouchers for purchase, network interface 3300 receives user purchase request from mobile device 2000, block 5040.

At block 5050, merchant services interface 3114 is engaged to perform the voucher purchase using payment-purchase engine 3130.

Merchant services interface 3114 generates the electronic voucher and associated data, and stores the electronic voucher into a merchant relationship database 3220, at block 5060. Associated data includes the amount of the voucher, and deal parameters. In some embodiments, as part of generating the electronic voucher, merchant services interface 3114 may generate a unique identifier associated with the electronic voucher. In such embodiments, the unique identifier may be used to verify the validity of the electronic voucher, and track the purchase and redemption of the electronic voucher.

In some embodiments, the purchased voucher data may include an identifier identifying the customer that purchased the electronic voucher, and/or the form of payment used in the purchase.

Any or all of the above-described information may be stored into the merchant relationship database 3220.

The voucher purchase information is also transmitted to the merchant 1200 for storage in a voucher list 1250, block 5070. The voucher purchase information may include the amount of the voucher, deal parameters, unique voucher identifier, customer identifier, and/or form of payment used in the purchase.

Figure 6:
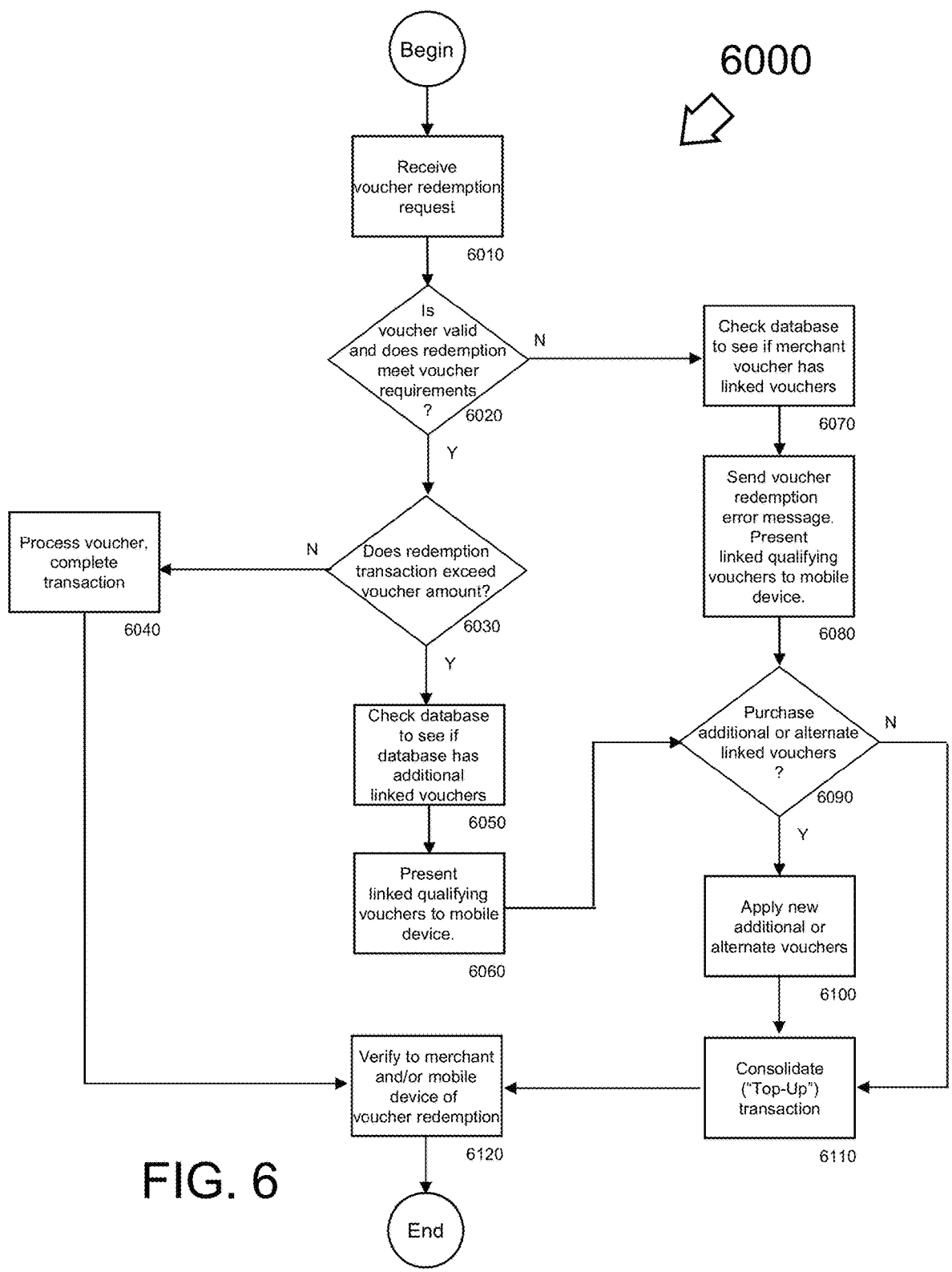
FIG. 6 flowcharts a payment processor method embodiment to consolidate the redemption of an electronic voucher from a mobile device.
Figure 7:
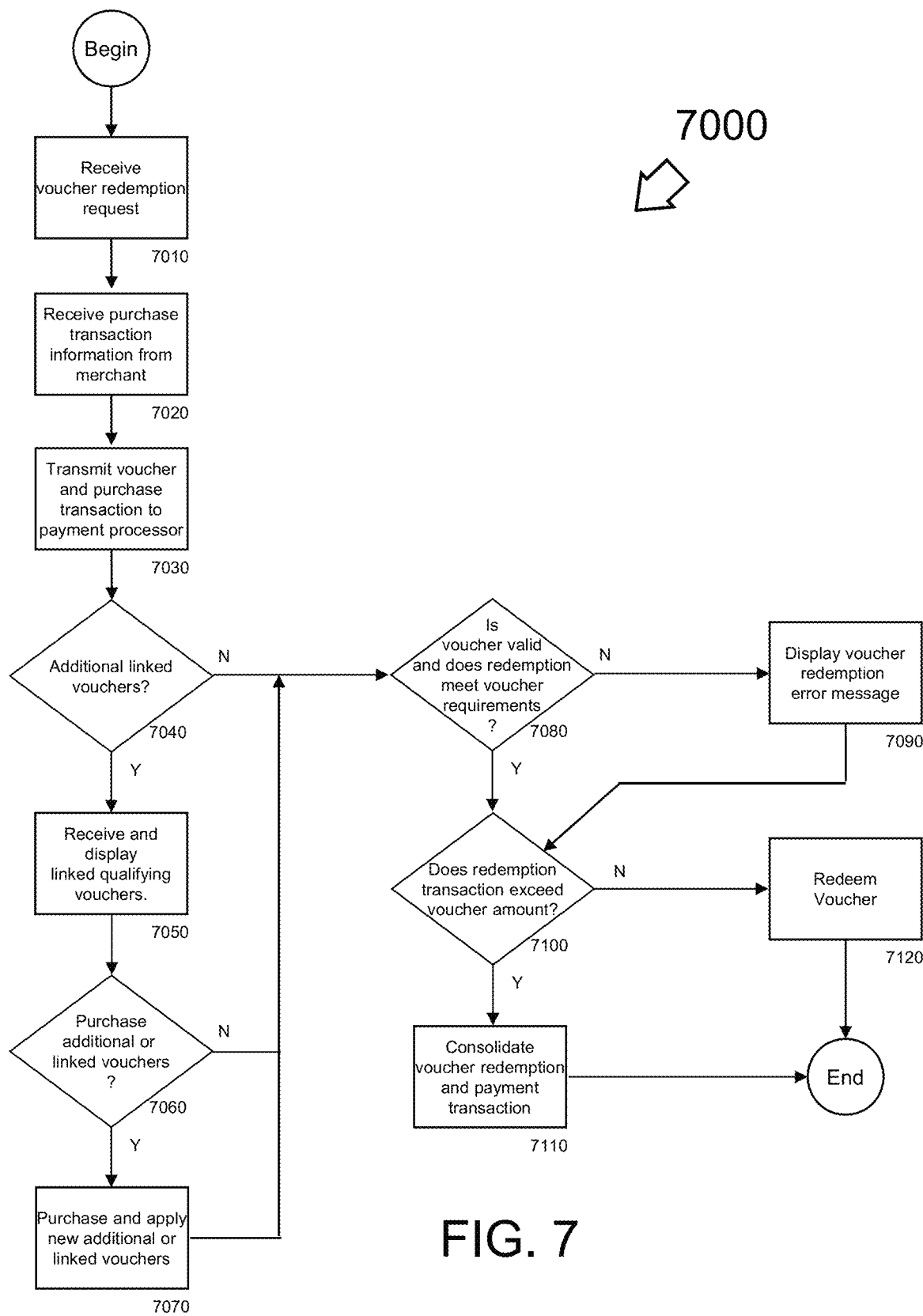
FIG. 7 flowcharts a mobile device method embodiment to consolidate the redemption of an electronic voucher on a mobile device.

FIGS. 6 and 7 flowchart method embodiments enable the consolidation of an electronic voucher redemption with a purchase transaction through mobile device 2000, constructed and operative in accordance with an embodiment of the present disclosure. FIG. 6 illustrates a payment processor redemption method 6000, while FIG. 7 illustrates a corresponding mobile device method 7000.

FIG. 6 describes consolidation of an electronic voucher redemption with a purchase transaction process 6000 executed by a payment processor server 3000, constructed and operative in accordance with an embodiment of the present disclosure.

Initially at block 6010, mobile application interface 3116 receives a request for voucher redemption from mobile device 2000 via network interface 3300.

Merchant services interface 3114 verifies the voucher is valid, compares the voucher identifier against merchant relationship database, and determines whether the redemption met the requirements of the voucher (the deal parameters), block 6020.

Validity and deal parameter verification is accomplished depending upon the source of the electronic voucher. Electronic vouchers issued by payment processor 3000 are verified against databases stored at payment processor; similarly, vouchers issued by merchant relationship manager 1100 are verified against the merchant relationship manager 1100.

As mentioned above, deal parameters may include purchase requirements, deal (participating) locations, date of expiration, and top-up payment details. In some embodiments, the purchased voucher data may include an identifier identifying the customer that purchased the electronic voucher and/or the type of payment used to make the purchase. Additionally, in some embodiments electronic vouchers have an associated unique identifier; in such embodiments, the unique identifier may be used to verify the validity of the electronic voucher, and track the purchase and redemption of the electronic voucher. Any or all of the above-described information may be retrieved from the merchant relationship database 3220 based on the unique voucher identifier.

For example, a voucher may be invalid because it is not being used at the correct merchant.

In another example, a voucher may be invalid because it has expired.

In yet another example, voucher details are compared to determine whether the purchase requirements for the voucher were met. For example, suppose that a voucher was $50 for a massage at a merchant spa 1200; merchant services interface 3114 determines whether a massage was indeed purchased from the merchant spa 1200.

If the redemption did not meet the voucher requirements, as determined at decision block 6020, merchant services interface 3114 checks to see if the merchant has alternate linked vouchers, block 6070. For example, if only pedicure services were purchased, the massage voucher would not apply; in this case, merchant services interface 3114 determines that a pedicure was purchased, and checks merchant offers database 3210 to see if any pedicure vouchers are offered by the merchant 1200.

Learning details of the voucher redemption transaction can be communicated to merchant services interface in a myriad of ways. In one embodiment, mobile application interface 3116 may receive details from the transaction from merchant 1200. In other embodiments, mobile application interface 3116 receives voucher transaction details directly from the mobile device 2000. In some instances, mobile device 2000 can use camera 2800 to take pictures of QR or bar codes with the transaction details encoded within such codes. In some instances, mobile application interface 3116 may receive a short message service (SMS) message from the mobile device 2000 containing the transaction details.

An error message is transmitted to the mobile device 2000 via the mobile application interface 3116 and the network interface 3300, block 6080. The error message may explain why the voucher redemption was rejected, and present any newly found linked qualifying voucher details. The process flow continues at block 6090.

If the redemption met the voucher requirements, as determined at decision block 6020, process 6000 continues at block 6030.

At block 6030, merchant services interface 3114 checks to see if the transaction amount exceeds the voucher amount. For example, if the voucher value was $50, and the massage was $100, the transaction exceeds the voucher amount. If the transaction does not exceed the voucher amount, the merchant services interface 3114 processes the voucher, block 6040, and verifies to merchant 1200 and/or mobile device 2000 that the voucher was redeemed, block 6120.

If the transaction exceeds the voucher amount, as determined at block 6030, merchant services interface 3114 checks to see if the merchant has additional linked vouchers available, block 6050. Presenting additional vouchers, at block 6060, offers merchant 1200 an opportunity to "upsell" additional products or services to the customer. Additionally, presenting additional vouchers, at block 6060, offers customer an opportunity to potentially save money on the additional services consumed. In some embodiments, vouchers for future product or service purchases may be offered by the merchant 1200. The process flow continues at block 6090.

At block 6090, the customer is presented the opportunity to purchase additional linked or alternate vouchers. If the customer decides not to purchase additional vouchers, the process continues at block 6110. If the customer decides to purchase additional or alternate vouchers, those vouchers are applied at block 6100. Note that in alternate embodiments, the customer is not presented any additional linked or alternate vouchers, and the process flow continues at block 6110.

At block 6110, the voucher redemption is consolidated with the payment process for any purchases not fully-covered by the voucher. For example, if the voucher was $50 to be applied to a massage, and the customer purchased a massage for $100, and a pedicure for $30, the purchases would exceed the voucher by $80. The voucher redemption would be applied to the transaction, and the $80 balance would be paid for by an electronic wallet, for example. Electronic wallet 2116 may support an electronic funds transaction, contactless payment, or near-field communication.

In other embodiments, an original voucher purchase transaction may be accessed from the purchased voucher database 2210 using a unique voucher identifier and executing a purchase transaction for the exceeded amount using payment credentials associated with the original voucher purchase transaction.

By consolidating the transaction, merchant relationship manager 1100, merchant 1200, and/or payment processor 3000 offer an easier way to track relationship of services/products purchased with vouchers redeemed. Additionally, customers can redeem the electronic voucher and pay for any additional products and services in one easy mechanism. Merchant services interface 3114 processes the voucher, block 6110, and verifies to merchant 1200 and/or mobile device 2000 that the voucher was redeemed, block 6120, and the process ends.

FIG. 7 describes consolidation of an electronic voucher redemption with a purchase transaction process 7000 executed by a mobile device 2000, constructed and operative in accordance with an embodiment of the present disclosure. As described above, mobile device 2000 is executing a merchant relationship application 2100.

Initially at block 7010, merchant relationship interface 2112 receives input from a user (via manual input 2500 or touch screen 2400) requesting an electronic voucher be redeemed for purchase of goods or services from merchant 1200. The voucher may be identified by a unique identifier, as described above.

At block 7020, merchant relationship application 2100 acquires the details of the purchase transaction from merchant 1200. Learning details of the voucher redemption transaction may be communicated to mobile device 2000 in a myriad of ways. In one embodiment, mobile relationship interface 2112 may electronically receive details from the transaction from merchant 1200 via near-field communication. In some instances, mobile device 2000 can use camera 2800 to take pictures of QR or bar codes with the transaction details encoded within such codes. For example, spa merchant 1200 can present a bill for a massage with a QR code printed on the bill; the camera 2800 would then capture transaction details from the QR code. In other embodiments, merchant 1200 may send an SMS message to the mobile device 2000 containing the transaction details. Other contactless/wireless methods may be used.

Once the purchase transaction details are captured, they are transmitted along with the electronic voucher to payment processor 3000, block 7030. Communication may be via a mobile telephony or other type of communications network.

At decision block 7040, mobile device 2000 receives details about any additional applicable vouchers issued by merchant 1200 or affiliates of the merchant. Depending upon the embodiment, the details may be received from merchant relationship manager 1100 or payment processor 3000 that have a partner discovery manager 3112 (and can therefore act as a merchant relationship manager 1100). For example, suppose mobile device 2000 is being used to redeem an electronic voucher for spa services; at decision block 7040, mobile device 2000 may receive additional voucher offers from the spa, and voucher offers from the affiliated restaurant located next to the spa.

If no applicable voucher offers are available at decision block 7040, the process flow continues at block 7080.

If applicable voucher offers are available at decision block 7040, the voucher offers are downloaded and displayed by mobile device 2000, block 7050.

At decision block 7060, the merchant relationship interface 2112 queries the user to determine if any additional or alternate vouchers are to be purchased. If so, the vouchers are purchased at block 7070. Note that in some embodiments this voucher purchase may be a process identical or similar to process 4000 shown in FIG. 4.

At block 7080, merchant relationship application 2100 checks with payment processor 3000 or merchant relationship manager 1100 to see if the voucher is valid and whether the redemption met the requirements of the voucher. The checking depends upon the source of the electronic voucher. Electronic vouchers issued by payment processor 3000 are verified against payment processor; similarly, vouchers issued by merchant relationship manager 1100 are verified against the merchant relationship manager 1100. Vouchers may be invalid if they have expired, or are being applied at the wrong merchant, for example. Vouchers may be rejected if the deal requirements are not met. For example, if a pedicure was purchased at a spa, a massage voucher may not be applicable.

If the voucher was invalid or the redemption did not meet the voucher requirements, an error message with an explanation is displayed at block 7090. The process flow continues at block 7100.

At decision block 7100, merchant relationship application 2100 checks with payment processor 3000 to see if the redemption transaction exceeds the voucher amount. For example, if the voucher value was $50, and the massage was $100, the transaction exceeds the voucher amount. If the transaction does not exceed the voucher amount, merchant relationship application 2100 marks the voucher as redeemed, and marks the voucher as redeemed in the purchased voucher database 2210, block 7120.

If the transaction exceeds the voucher amount, as determined at block 7100, at block 7110, the voucher redemption is consolidated with the payment process for any purchases not fully-covered by the voucher. In consolidating the voucher redemption and payment process, the redemption and payment is consolidated and processed as a single transaction.

In some embodiments, the form of payment used to purchase the voucher is automatically used to pay the excess transaction amount. For example, if the voucher was $50 to be applied to a massage, and the customer purchased a massage for $100, and a pedicure for $30, the purchases would exceed the voucher by $80; the MasterCard payment card used to purchase the electronic voucher would automatically be used to pay the excess purchase amount. In some embodiments, this may be accomplished by accessing an original voucher purchase transaction in a merchant relationship database 3220 using the unique voucher identifier and executing a purchase transaction for the exceeded amount using payment credentials associated with the original voucher purchase transaction.

In other embodiments, users may be prompted for an electronic method to pay for the difference, such as credit cards, debit cards, prepaid cards, electronic checks, or electronic wallets 2116.

Process 7000 then ends.

Figure 9:
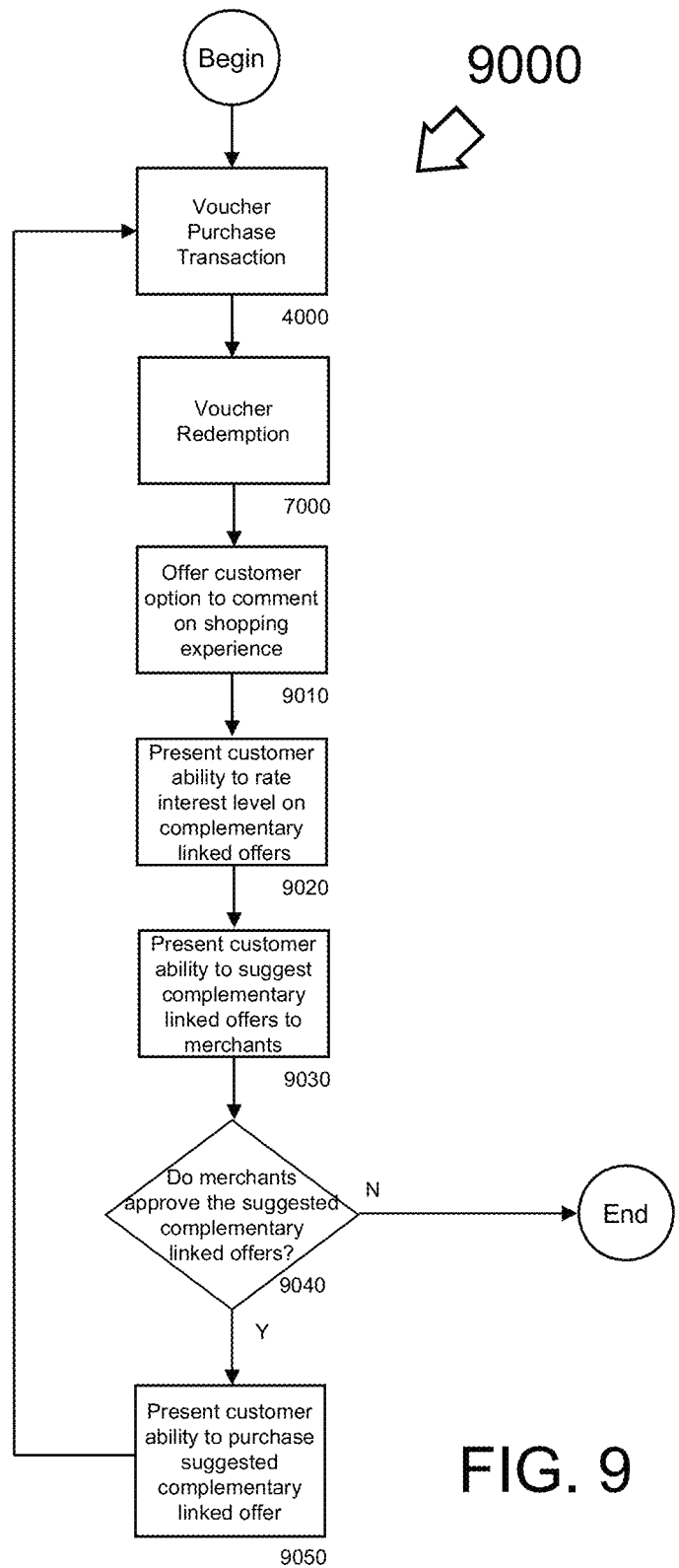
FIG. 9 flowcharts a mobile device method embodiment to facilitate customer linking of complementary electronic vouchers on a mobile device.
Figure 10:
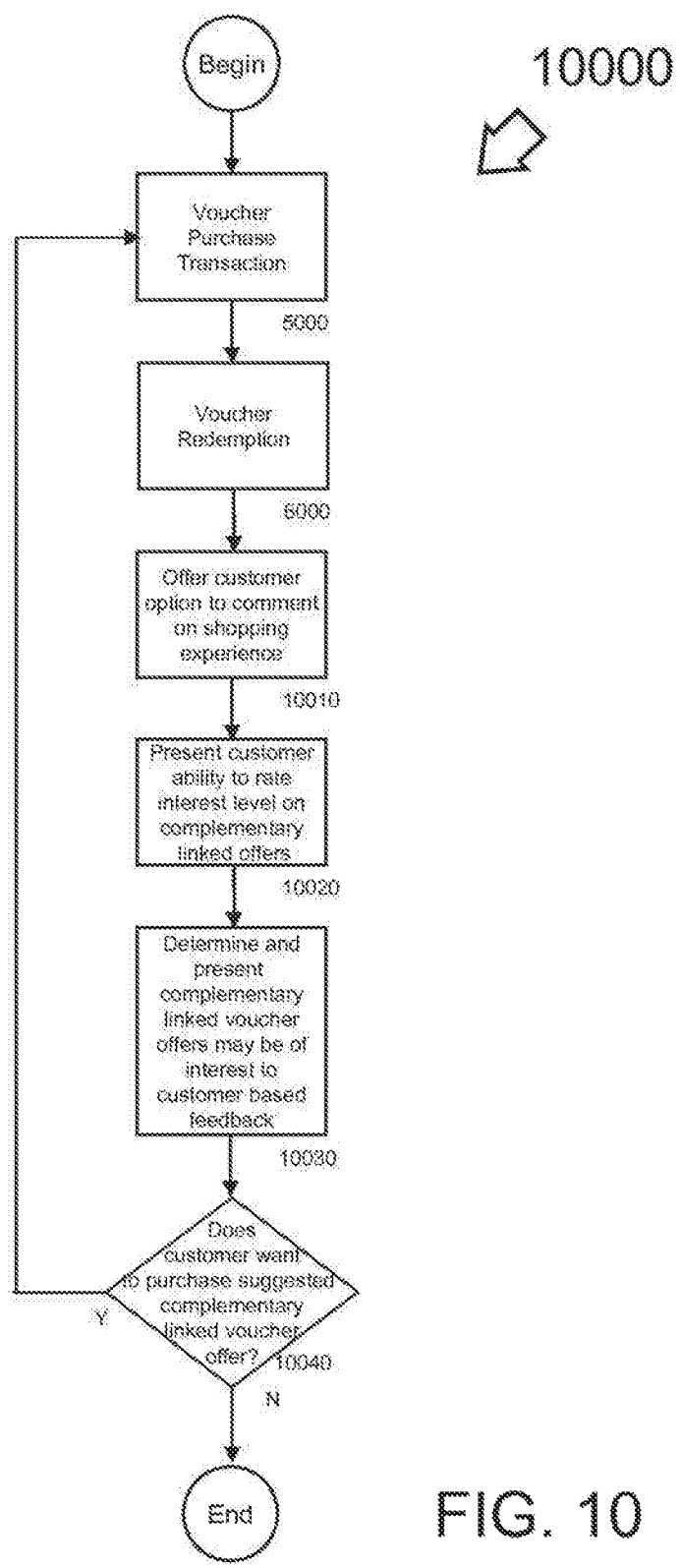
FIG. 10 flowcharts a payment processor method embodiment to facilitate customer input on complementary electronic vouchers on a mobile device.
Figure 11:
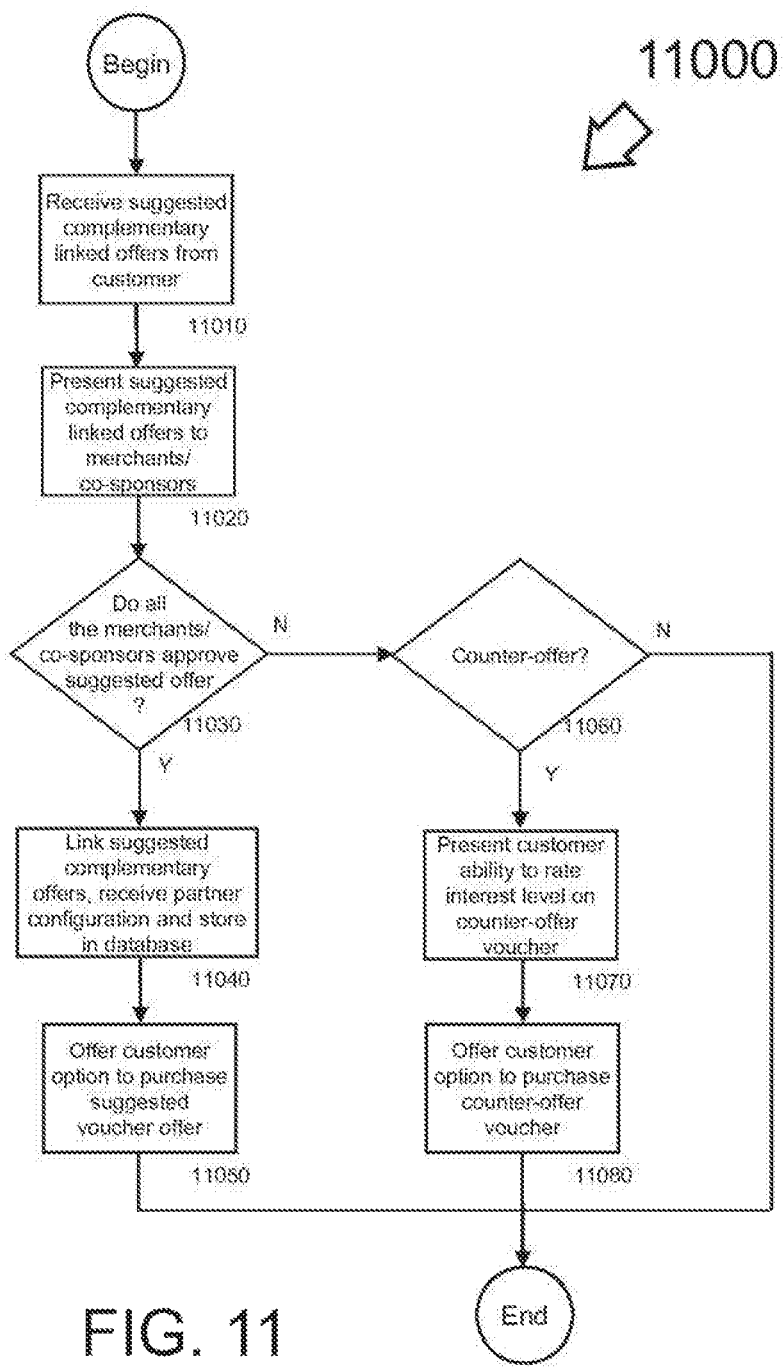
FIG. 11 flowcharts a payment processor method embodiment to facilitate customer linking of complementary electronic vouchers on a mobile device.

FIGS. 9-11 flowchart method embodiments to facilitate customer feedback on the linking of complementary electronic vouchers through mobile device 2000, constructed and operative in accordance with an embodiment of the present disclosure. FIG. 9 illustrates a mobile device method 9000, while FIGS. 10 and 11 illustrate corresponding payment processor methods 10000 and 11000.

As mentioned herein, various embodiments link voucher offers with other complementary voucher offers. Embodiments may also seek customer input for their opinion of presented linked offers to facilitate better selection and more uniquely tailor offers for the customer. FIG. 9 flowcharts such an embodiment. Process 9000 is a mobile device method embodiment seeking customer comment on a voucher redemption experience and presented linked complementary offers.

Process 9000 may be used in conjunction with a voucher purchase transaction 4000 and a voucher redemption 7000, as shown in FIG. 9, or separately from the purchase/redemption.

Process 9000 may include at least one or more of blocks 9010, 9020, and/or 9030-9050.

At block 9010, the mobile phone application interface 2130 presents the user the option to comment on their shopping experience. Feedback may vary from allowing users to grade their experience with a letter score, numeric score, text comment fields, or any combination thereof. In some embodiments, users may be given a variety categories in which to comment on their experience of purchasing or redeeming a voucher offer, such as cleanliness of store premises, how the customer was treated by sales clerks, access to the items purchased, quality of the items, or other categories that may be defined by a merchant or co-sponsor. Additionally, at block 9010, the user feedback is uploaded to mobile application interface 3116, which may in-turn forward the information to merchant 1200 or co-sponsor 1200. The user feedback may provide invaluable information to better manage offers and customer expectations. On the other side, comments of appreciation could inform the merchant that an offer is resonating well with the customers and the merchant may want to keep running the offer or alter it slightly to attract a wider audience.

At block 9020, the mobile phone application interface 2130 presents the user the option to comment on presented linked voucher offers. Comments may vary from allowing users to grade the presented linked voucher offer with a "like"/"dislike," a letter score, numeric score, text comment fields, or any combination thereof. The user feedback is uploaded to mobile application interface 3116, which may in-turn forward the information to merchant 1200 or co-sponsor 1200.

In some instances, the process at block 9020 could be integrated into part of process 7000 at block 7050.

The user feedback from block 9020 may be used in analyzing the types of linked offers that customers are interested in, so that customized offers may be tailored to individual customers.

At block 9030, customers are presented the ability to suggest voucher offers to merchants.

In some embodiments, customer specifies a single merchant or category of merchants and the suggested deal. For example, the customer may suggest to a merchant (coffee shop) that they offer a "buy one get one free" or some other kind of discount.

In yet other embodiments, customers may select a first merchant or a first category of merchants, and match the first merchant with a second merchant or second category of merchants. For example, customer may decide to match a first merchant (coffee shop) with a second merchant (a bakery located near the coffee shop), and suggest that the two merchants present a complementary linked offer. In other embodiments, customer may specify a proposed complementary linked offer in greater detail. For example, customer may suggest that a linked offer for a discounted coffee (at the coffee shop) and pastries (at the bakery). In another example, a customer may suggest the linking of discounted movie tickets (at a movie theater chain) with a discounted dinner (at a restaurant chain). The details of the proposed linked voucher are uploaded to mobile application interface 3116, which in-turn forward the information to merchants 1200A or co-sponsors 1200B. The merchants 1200A or co-sponsors 1200B are given a fixed period of time to respond to the proposed linked voucher offer. Failure to respond by a merchant is automatically marked as declining the proposed linked voucher offer.

If the merchants 1200A or co-sponsors 1200B do not approve the proposed linked voucher, the process ends.

However, if both merchants 1200A or co-sponsors 1200B approve the proposed linked voucher, a resulting linked voucher is stored in merchant offers database 3210, and may be offered for purchase by the customer at block 9050. In some embodiments, merchants 1200A or co-sponsors 1200B may present a counter-offer linked voucher to the customer. For example, a coffee shop may counter-offer discounted coffee if the customer also buys a donut at the coffee shop instead of pastries at the bakery, or a smaller discount than what is proposed by the customer.

FIG. 10 flowcharts a payment processor method embodiment to facilitate customer input on complementary electronic vouchers on a mobile device.

Process 10000 may be used in conjunction with a voucher purchase transaction 5000 and a voucher redemption 6000, as shown in FIG. 10, or separately from the purchase/redemption.

Process 10000 may include at least one or more of blocks 10010, 10020, and/or 10030-10040.

At block 10010, the voucher redemption engine 3110 receives comments on a user shopping experience from mobile device 2000. As mentioned with complementary process 9000, embodiments may vary from allowing users to grade their experience with a letter score, numeric score, text comment fields, or any combination thereof. Users may be given a variety categories in which to comment on their experience of purchasing or redeeming a voucher offer, such as cleanliness of store premises, how the customer was treated by sales clerks, access to the items purchased, quality of the items, or other categories that may be defined by a merchant or co-sponsor. The user feedback is downloaded by mobile application interface 3116, which may in-turn forward the information to merchant 1200 or co-sponsor 1200.

At block 10020, the mobile phone application interface 2130 presents the user a list of linked voucher offers along with the option to comment on the presented linked voucher offers. The user feedback is uploaded to mobile application interface 3116, which may in-turn forward the information to merchant 1200 or co-sponsor 1200.

At block 10030, linkage manager 3140 suggests complementary linked offers to mobile device 2000 for user feedback. In turn, mobile application interface 3116 forwards the proposed complementary linked offers to the specified merchant or merchants that fall within a specified category. The merchants are given a set period of time to respond to the suggested voucher offer. If the merchants fail to respond, the customer is informed that the proposed offer is not accepted.

If the specified merchants/co-sponsors 1200 approve the suggested voucher offer, linkage manager 3140 creates the linked complementary offer, and stores the resulting linkage data 3212, partner data 3214, and/or co-sponsor data 3216 into merchant offers database 3210.

If the customer wishes to purchase any of the suggested complementary linked voucher offer, as determined at block 10040, the process flow returns to process 5000. If not, process 10000 ends.

FIG. 11 flowcharts a payment processor method embodiment to facilitate customer linking of complementary electronic vouchers on a mobile device. Process 11000 is the payment processor method which allows customers to suggest linked complementary voucher offers to merchants via payment processor 3000 acting as a merchant relationship manager 1100.

Initially, at block 11010, the payment processor 3000 receives the suggested complementary linked offer from mobile device 2000.

The suggested complementary linked offer is uploaded to mobile application interface 3116, which in-turn forwards the information to merchant 1200 or co-sponsor 1200, block 11020.

The merchants are given a set period of time to respond to the suggested voucher offer. If the merchants fail to respond, the customer is informed that the proposed offer is not accepted.

If the specified merchants/co-sponsors 1200 approve the suggested voucher offer, linkage manager 3140 creates the linked complementary offer, and stores the resulting linkage data 3212, partner data 3214, and/or co-sponsor data 3216 into merchant offers database 3210, block 11040

At block 11050, the customer is offered the option to purchase the suggested voucher offer. The customer may be alerted to the approved linked complementary voucher offer via electronic mail, text message, electronic mail, pop-up notification on mobile device 2000, dedicated application on mobile device 2000, or any other electronic method known in the art.

If the merchant 1200 decides to present a counter-offer, the details of the offer is alerted to the customer, block 11060. The customer may be alerted to the approved linked complementary voucher offer via electronic mail, text message, electronic mail, pop-up notification on mobile device 2000, dedicated application on mobile device 2000, or any other electronic method known in the art.

The customer is presented an ability to rate their interest level on the counter-offered voucher, block 11070. The method to rate the counter-offered voucher may be the same or similar to process 9000. The customer is offered the option to purchase the suggested voucher offer, block 11080.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. An apparatus comprising:
    a network interface configured to receive, from a user device, a proposed electronic voucher comprising a first merchant identifier and a second merchant identifier; and
    a processor configured to:
        transmit to a first merchant computer associated with the first merchant identifier, the proposed electronic voucher and a time limit for accepting the proposed electronic voucher via the network interface;
        transmit via the network interface, to a second merchant computer associated with the second merchant identifier, the proposed electronic voucher and a time limit for accepting the proposed electronic voucher;
        receive via the network interface, prior to the time limit, a first response indicative of an approval of the proposed electronic voucher from the first merchant computer;
        receive via the network interface, prior to the time limit, a second response indicative of an approval of the proposed electronic voucher from the second merchant computer;
        determining, based on the first merchant identifier and the second merchant identifier, that the first merchant identifier and the second merchant identifier are not linked in a merchant database; and
        generate an association in the merchant database between the first merchant identifier and the second merchant identifier based on the proposed electronic voucher, the first response indicative of the approval of the proposed electronic voucher, and the second response indicative of the approval of the proposed electronic voucher.

2. The apparatus of claim 1, wherein the processor is further configured to generate a user-proposed electronic voucher based on the proposed electronic voucher, the first response indicative of the approval of the proposed electronic voucher, and the second response indicative of the approval of the proposed electronic voucher.

3. The apparatus of claim 2 wherein the processor is further configured to, via the network interface, transmit the user-proposed electronic voucher to the user device.

4. The apparatus of claim 1, wherein the proposed electronic voucher further comprises a first proposed price associated with a first product offered by the first merchant and a second proposed price associated with a second product offered by the second merchant.

5. The apparatus of claim 4 wherein the network interface is further configured to:
receive, prior to the time limit from the first merchant computer, a first counter-offer associated with the first proposed price for the first product offered by the first merchant; and
receive, prior to the time limit from the second merchant computer, a second counter-offer associated with the second proposed price for the second product offered by the second merchant.

6. The apparatus of claim 1, wherein the processor is further configured to generate, based on the first counter-offer and the second counter-offer, a second proposed electronic voucher.

7. The apparatus of claim 6, wherein the processor is further configured to, via the network interface, transmit, to the user device, the second proposed electronic voucher.

8. A non-transitory computer readable medium encoded with data and instructions, which when executed by a computing device cause the computing device to:
receive, from a user device, a proposed electronic voucher comprising a first merchant identifier and a second merchant identifier;
transmit, to a first merchant computer associated with the first merchant identifier, the proposed electronic voucher and a time limit for accepting the proposed electronic voucher;
transmit, to a second merchant computer associated with the second merchant identifier, the proposed electronic voucher and a time limit for accepting the proposed electronic voucher;
receive, prior to the time limit, a first response indicative of an approval of the proposed electronic voucher from the first merchant computer;
receive, prior to the time limit, a second response indicative of an approval of the proposed electronic voucher from the second merchant computer;
determine, based on the first merchant identifier and the second merchant identifier, that the first merchant identifier and the second merchant identifier are not linked in a merchant database; and
generate an association in the merchant database between the first merchant identifier and the second merchant identifier based on the proposed electronic voucher, the first response indicative of the approval of the proposed electronic voucher, and the second response indicative of the approval of the proposed electronic voucher.

9. The non-transitory computer readable medium of claim 8 wherein the data and instructions, when executed by the computing device further cause the computing device to generate a user-proposed electronic voucher based on the proposed electronic voucher, the first response indicative of the approval of the proposed electronic voucher, and the second response indicative of the approval of the proposed electronic voucher.

10. The non-transitory computer readable medium of claim 9 wherein the data and instructions, when executed by the computing device further cause the computing device to transmit, to the user device, the user-proposed electronic voucher.

11. The non-transitory computer readable medium of claim 8, wherein the proposed electronic voucher further comprises a first proposed price associated with a first product offered by the first merchant and a second proposed price associated with a second product offered by the second merchant.

12. The non-transitory computer readable medium of claim 11 wherein the data and instructions, when executed by the computing device further cause the computing device to:
receive, prior to the time limit from the first merchant computer, a first counter-offer associated with the first proposed price for the first product offered by the first merchant; and
receive, prior to the time limit from the second merchant computer, a second counter-offer associated with the second proposed price for the second product offered by the second merchant.

13. The non-transitory computer readable medium of claim 8, wherein the data and instructions, when executed by the computing device further cause the computing device to generate, based on the first counter-offer and the second counter-offer, a second proposed electronic voucher.

14. The non-transitory computer readable medium of claim 13, wherein the data and instructions, when executed by the computing device further cause the computing device to transmit, to the user device, the second proposed electronic voucher.

* * * * *